United States Patent [19]
Seki et al.

[11] Patent Number: 5,353,092
[45] Date of Patent: Oct. 4, 1994

[54] DATA IMPRINTABLE CAMERA

[75] Inventors: Yoichi Seki; Hiroyuki Saito, both of Yotsukaido, Japan

[73] Assignee: Seikosha Co., Ltd., Japan

[21] Appl. No.: 137,458

[22] Filed: Oct. 15, 1993

[51] Int. Cl.$^5$ .................. G03B 7/00; G03B 17/24
[52] U.S. Cl. ...................... 354/412; 354/106
[58] Field of Search ............ 354/412, 410, 105, 106

[56] References Cited

U.S. PATENT DOCUMENTS

| | | | |
|---|---|---|---|
| 4,989,025 | 1/1991 | Matsumura et al. | 354/106 |
| 5,089,833 | 2/1992 | Takahashi et al. | 354/105 |
| 5,150,139 | 9/1992 | Tsukahara | 354/106 |
| 5,210,567 | 5/1993 | Takahashi | 354/412 |

Primary Examiner—Michael L. Gellner
Assistant Examiner—Jae N. Noh
Attorney, Agent, or Firm—Bruce L. Adams; Van C. Wilks

[57] ABSTRACT

A camera capable of imprinting data in which data imprinting means is provided in a control circuit for controlling photographing and power consumption is reduced by appropriately changing intervals for driving a central processing unit (CPU) in accordance to data to be imprinted.

A drive signal outputting means 7 is included in the control circuit 1 for controlling photographing and a first drive signal is output from a short time counting means 5 at intervals of one minute and a second drive signal is output from a long time counting means 6 at intervals of 10 minutes, respectively, to a drive signal detecting means 8. When data imprinting mode is set up in a time mode (indicating in unit of minute), the CPU 9 is driven by the first drive signal and time data in a memory 9d is added up at intervals of one minute. When a date mode (indicating in unit of day) is set up, the CPU 9 is driven by the second drive signal and the time data is added up at intervals of 10 minutes. When photographing, the date or time data in the memory 9d is output to data imprinting means 18 to imprint on a film.

5 Claims, 4 Drawing Sheets

DATA IMPRINTABLE CAMERA

BACKGROUND OF THE INVENTION

1. Field of the Invention

The present invention relates to a camera capable of imprinting data such as time and date on a film.

2. Description of the Related Art

Conventionally, among cameras capable of imprinting data on a film, there exists a camera which allows to select a mode between modes for imprinting date data for indicating year-month-day and a day of the week and for imprinting time data for indicating day-hour-minute.

Further, among such cameras capable of imprinting data on a film, there is one that has a time piece circuit containing an oscillation circuit, divider, year-month-day calculating means independently beside a control circuit for controlling photographing of the camera. In such a case, two microcomputers for structuring the control circuit and the time piece circuit have to be provided within one camera, complicating the structure of the camera and bringing about a higher cost. Then, a camera has been proposed in which drive signal outputting means containing an oscillation circuit and dividing circuit outputs drive signals at certain intervals is contained in a control circuit comprising one microcomputer and a central processing unit (hereinafter referred to as a "CPU") is driven by the drive signal at the certain intervals to update time data (Japanese Patent Laid Open No. 3-140931 and others).

In such a case when such drive signal generating means is included to drive the CPU at certain intervals to update time data, the time data is always updated at intervals of imprintable minimum unit time. That is, in the prior art structure, the CPU has to be driven at least at intervals of one minute to update the time data, and in the example of the publication mentioned above, the CPU is driven at intervals of one second. However, because indicated data is actually changed once in 24 hours when the camera is set up in the mode for imprinting date data, the data needs not be updated at intervals of one minute and there is practically no problem even if the data is updated at longer intervals. Thus, the prior art camera consumes electric current more than it actually needs because it always drives the CPU at intervals of minimum unit time to update time data regardless of the modes of the data imprinting means and even when the main switch is switched off and the camera is in a state incapable of photographing.

Accordingly, it is an object of the present invention to simplify the structure and lower the cost of the camera capable of imprinting data by including drive signal generating means in the control circuit.

It is another object of the present invention to reduce the power consumption by appropriately changing updating intervals of time data.

SUMMARY OF THE INVENTION

In order to attain the aforementioned goal, the data imprintable camera of the present invention comprises data imprinting means for imprinting data on a film and a control circuit for controlling photographing operations and for outputting data to the data imprinting means. The control means contains drive signal outputting means and a central processing unit. The drive signal outputting means has an oscillation circuit and at least one time counting means for timing standard clock signals supplied from the oscillation circuit via a dividing circuit and outputs a first drive signal at intervals of first preset time and a second drive signal at intervals of second preset time which is longer than the first preset time. The central processing unit is set up so that it selects either first or second drive signal and by being driven by the selected drive signal, updates date and time data.

The drive signal outputting means contains short time counting means for outputting the first drive signal based on the standard clock signal supplied from the oscillation circuit via the dividing circuit and long time counting means for outputting the second drive signal based on the standard clock signal.

Or, the drive signal outputting means may contain a dividing circuit for outputting the standard clock signal and first drive signal and the time counting means for outputting the second drive signal based on the standard clock signal.

The data imprinting means is capable of imprinting date data or time data selectively on the film and the central processing unit is driven at intervals of the first preset time by the first drive signal when the imprinting means is set up so as to imprint the time data and is driven by the second drive signal when the imprinting means is set up so as to imprint the date data.

The central processing unit is set up to be driven by the second drive signal when a main switch of the camera is switched off and the camera is in a state incapable of photographing.

The above and other advantages of the present invention will become more apparent in the following description and the accompanying drawings in which like numerals refer to like parts.

Figure 1:
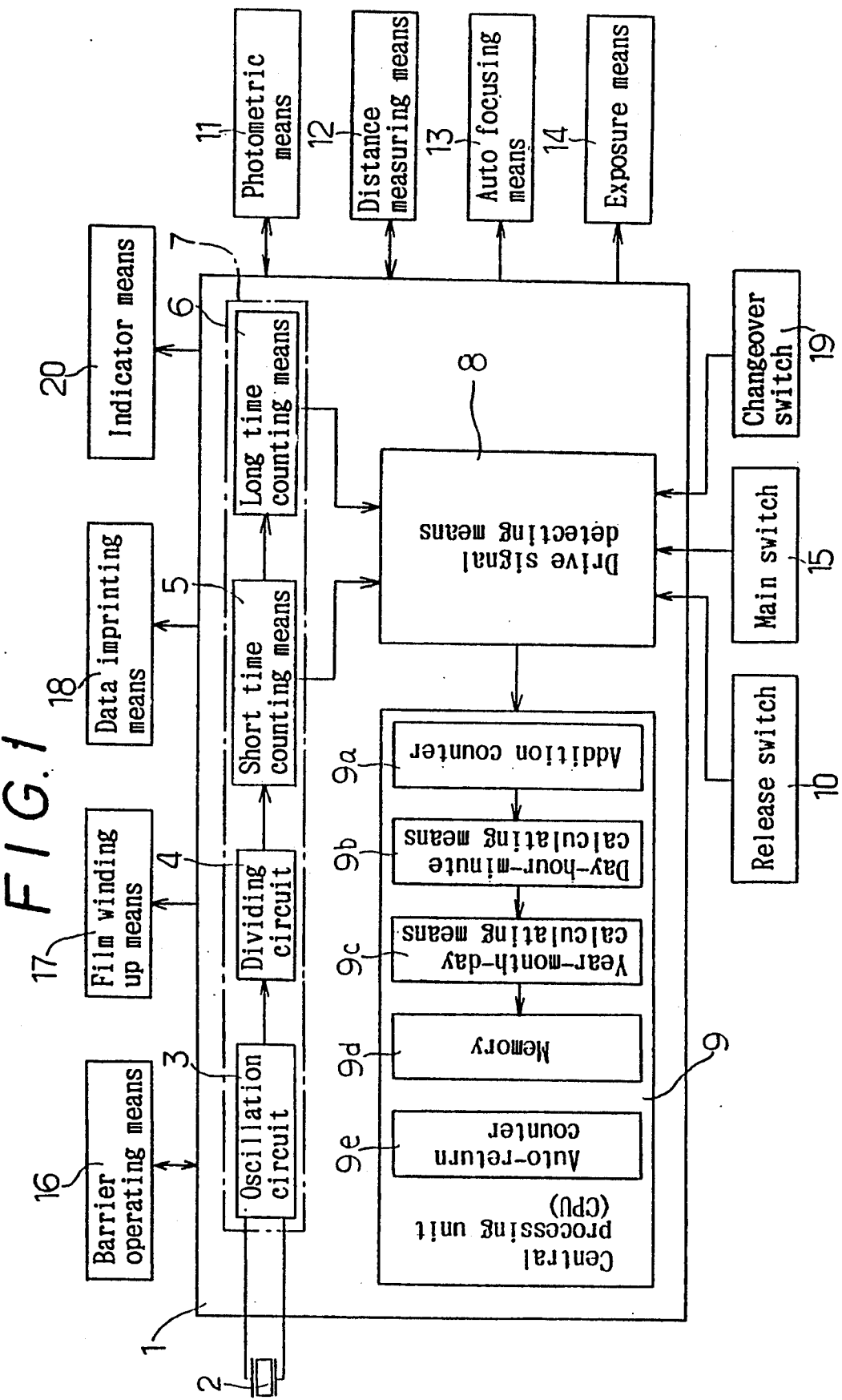
FIG. 1 is a block diagram showing a first embodiment of the present invention.

Description of Preferred Embodiments:

FIG. 1 is a block diagram showing a first embodiment of the present invention. The figure shows a camera in which a function for imprinting data is provided in a photographing control circuit thereof.

The control circuit 1 for electrically controlling the whole operation of the camera comprises a drive signal outputting means 7 comprising an oscillation circuit 3 to which a quartz oscillator 2 is attached, a dividing circuit connected with the oscillation circuit 3, a short time counting means 5 to which standard clock signals are supplied from the dividing circuit 4 and a long time counting means 6 to which signals are supplied from the short time counting means 5; a drive signal detecting means 8 to which first drive signals are supplied from the short time counting means 5 at intervals of one minute and second drive signals are supplied from the long time counting means 6 at intervals of 10 minutes; and a central processing unit (hereinafter referred to as the CPU) 9 driven by the drive signal detecting means 8. The oscillation circuit 3 oscillates at about 32 KHz and receiving such oscillation, the dividing circuit 4 outputs standard clock signals at intervals of one second. Receiving the standard clock signals, the short time counting means 5 outputs the first drive signals at intervals of one minute and the long time counting means 6 outputs the second drive signals at intervals of 10 minutes.

The CPU 9 contains an addition counter 9a, day-hour-minute calculating means 9b, year-month-day calculating means 9c, memory 9d for storing date and time data and auto-return counter 9e. The addition counter 9a adds up in correspondence to the drive signals and counts in units of minutes. The day-hour-minute calculating means 9b calculates the number of days from the quotient obtained by dividing the addition result by 1440, calculates time by dividing the residue by 60 and indicates minutes by the residue. Time and minute are thus found. Next, the year-month-day calculating means 9c collates a calendar memorized beforehand with the number of days found to calculate year-month-day considering long months, short months, bissextile years and others. As described above, year, month, day, time and minute are found by the day-hour-minute calculating means 9b and year-month-day calculating means 9c and the result thereof is stored in the memory 9d.

A release switch 10, photometer means 11 for measuring a brightness of an object, distance measuring means 12 for measuring a distance to the object, auto focusing means 13 for extending a photographing lens (not shown), exposure means 14 for exposing on a film (not shown), main switch 15 of the camera, barrier operating means 16 and film winding up means are connected to the control circuit 1 to control photographing operations. Further, data imprinting means 18 for imprinting data output from the CPU 9 on the film, changeover switch 19 for selecting data to be imprinted and indicator means 20 such as a liquid crystal panel for indicating data to be imprinted are connected with the control circuit 1.

Figure 2:
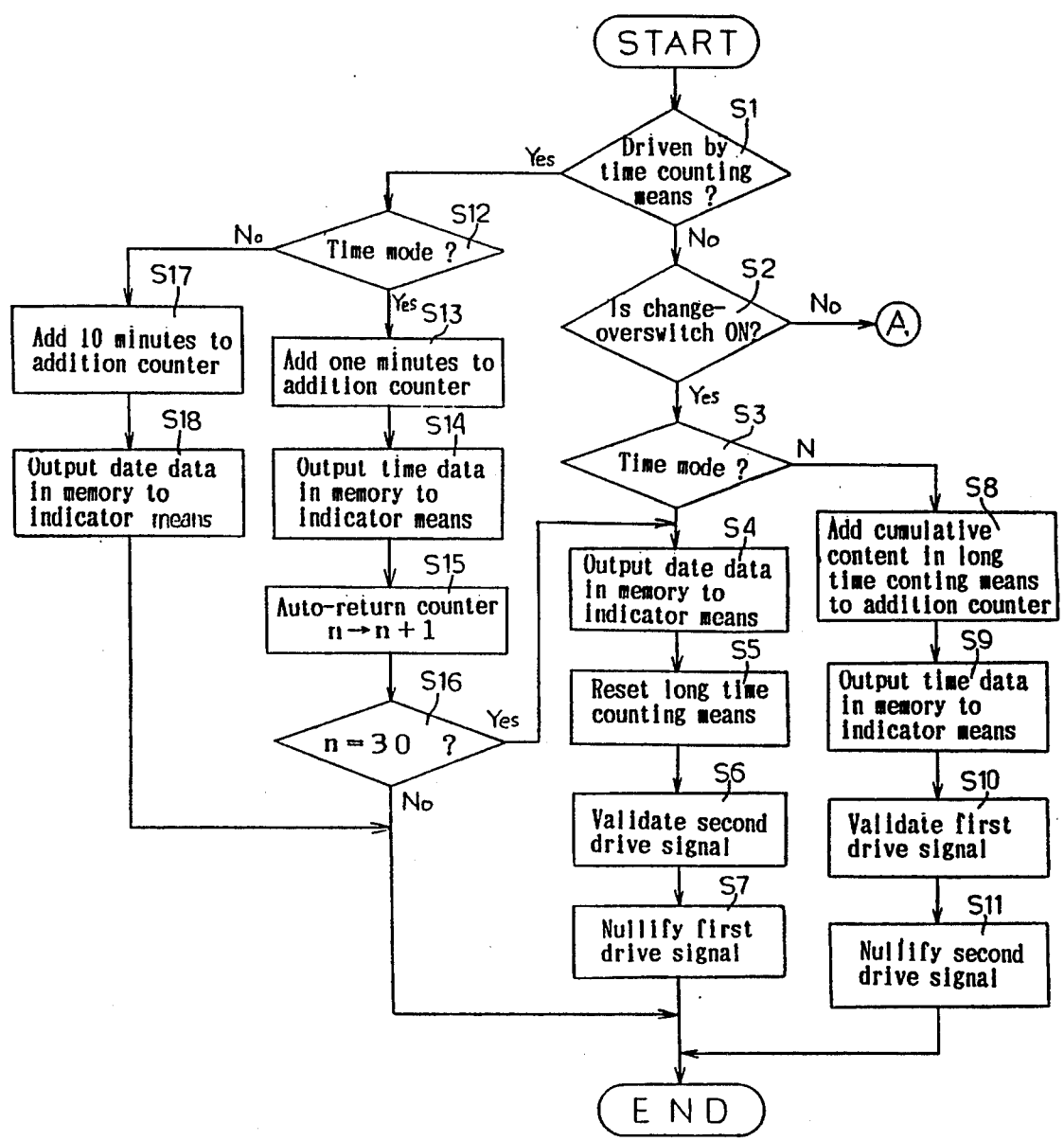
FIG. 2 is a flowchart showing an operation of the first embodiment.
Figure 3:
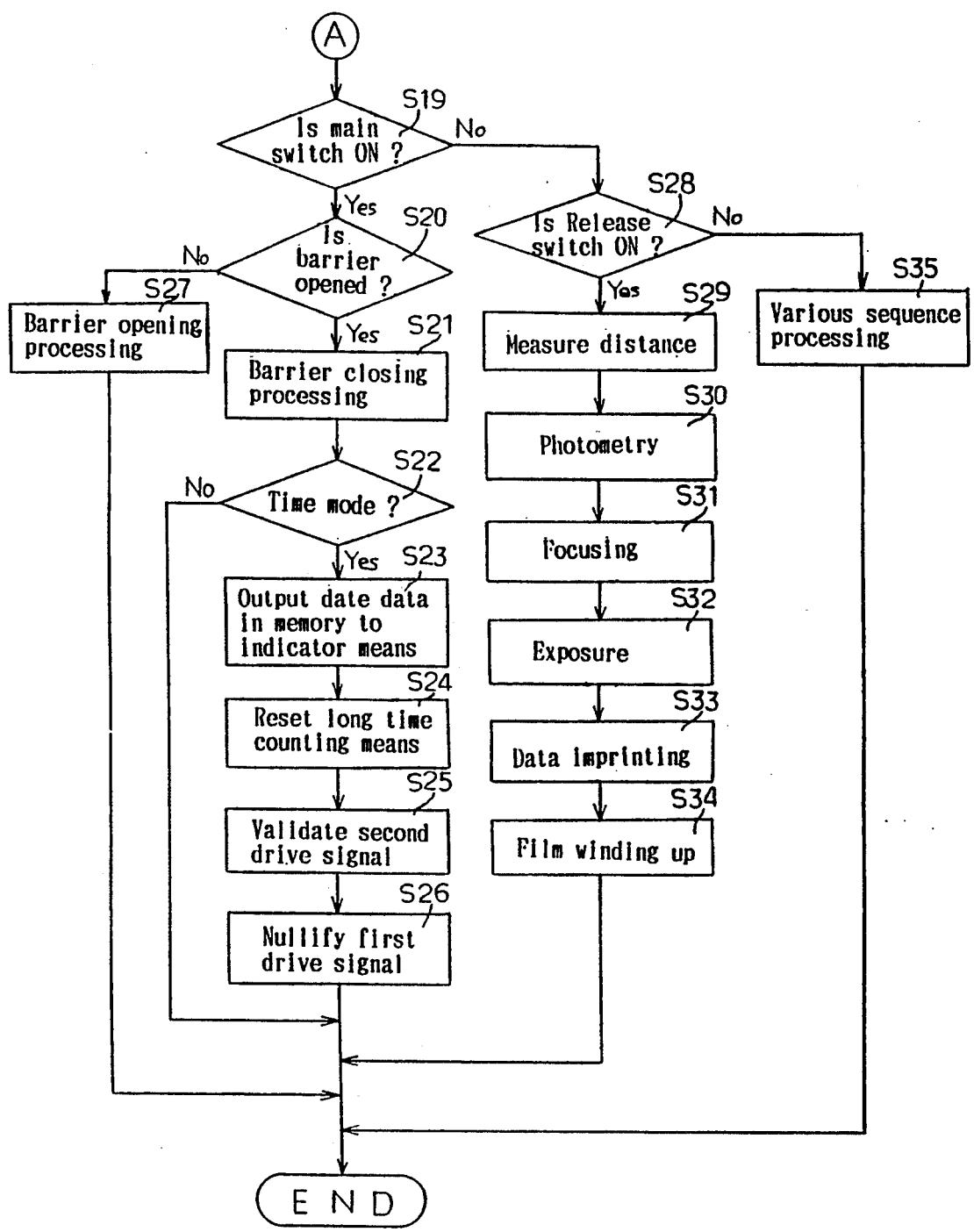
FIG. 3 is a flowchart showing the operation of the first embodiment after Step A in FIG. 2.

FIGS. 2 and 3 are flowcharts of the process carried out by the CPU 9 driven in the camera structured as described above. In FIG. 2, it is first discriminated if the CPU 9 has been driven by the drive signal from the short time counting means 5 or the long time counting means 6 (Step 1).

If the answer is NO in Step 1, i.e. it was not driven by the time counting means 5 nor 6, it is discriminated whether the CPU 9 has been driven because a user manipulated the changeover switch 19 (Step 2). If the changeover switch 19 has been manipulated, data to be imprinted is changed. Because a date mode (for indicating year-month-day and a day of the week) and a time mode (for indicating day-hour-minute) are changed alternately every time when the changeover switch 19 is pressed in the present embodiment, it is confirmed which mode has been chosen at the time when the user pressed the changeover switch 19 (Step 3). If it is in the time mode, date data indicating year-month-day is output from the memory 9d of the CPU 9 to the indicator means 20 (Step 4) in order to change to the date mode. Thereby data of year-month-day can be indicated. Then the long time counting means 6 is reset to "0" (Step 5). Further, the second drive signal from the long time counting means 6 is validated (Step 6) and the first drive signal from the short time counting means 5 is nullified (Step 7). In the present embodiment, although the drive signals from the both time counting means are always input to the drive signal detecting means 8, either one of the drive signals is validated and another is nullified by being processed on a software.

When the mode is in the date mode in Step 3, contents of accumulation (0–9 minutes) being timed in the long time counting means 6 is added to the addition counter 9a of the CPU 9 in order to change to the time mode (Step 8). Then, based on the addition result of the addition counter 9a, date and time data are calculated by the day-hour-minute calculating means 9b and the year-month-day calculating means 9c and the result thereof are stored in the memory 9d. Time data of day-hour-minute is then output from the memory 9d to the indicator means 20 (Step 9). Thereby, the time data of day-hour-minute can be indicated. Then the first drive signal from the short time counting means 5 is validated (Step 10) and the second signal from the long time counting means 6 is nullified (Step 11).

If the answer is YES in Step 1, i.e., the drive signal is supplied from the time counting means 5 or 6, it is discriminated whether the time mode is set or the date mode is set, similarly to the case in Step 3 (Step 12). If it is in the time mode, it is receiving the first drive signal at intervals of one minute from the short time counting means 5, so that one minute is added to the addition counter 9a of the CPU 9 (Step 13), date and time data are calculated by the day-hour-minute calculating means 9b and the year-month-day calculating means 9c and the data is stored in the memory 9d. Then the time data is output from the memory 9d to the indicator means 20 (Step 14). Moreover, "1" is added to count value n of the auto-return counter 9e (Step 15). When the value n of the auto-return counter 9e reaches to a predetermined value ("30", i.e. when 30 minutes elapse in the present embodiment) (Step 16), the mode is automatically changed to the date mode and the aforementioned Steps 4 through 7 are performed.

If it is set up in the date mode, it is receiving the second drive signal from the long time counting means 6 at intervals of 10 minutes, so that 10 minutes are added to the addition counter 9a of the CPU 9 (Step 17), date and time data are calculated by the day-hour-minute calculating means 9b and the year-month-day calculating means 9c and the resultant data is stored in the memory 9d. Then the date data is output from the memory 9d to the indicator means 20 (Step 18).

If the changeover switch 19 has not been manipulated in Step 2, the process moves to the flow after Step A shown in FIG. 3. At first, it is discriminated if the CPU 9 has been driven as a result of manipulation of the main switch 15 (Step 19). If it is discriminated that the main switch 15 has been manipulated by the user, it is discriminated whether a barrier (not shown) is opened or closed by the barrier operating means 16 (Step 20). If the barrier is opened, a barrier closing processing is carried out, because the user has manipulated the main switch 15 to put into a state incapable of photographing after completing photographing (Step 21). The barrier is closed by the barrier operating means 16 at first to protect lenses and along that, the drive signal detecting means 8 is set up so that the CPU 9 will not be driven even if the release switch 10 and the changeover switch 19 are manipulated. In succession, it is discriminated which mode the data imprinting mode is in (Step 22). If it is in the time mode, date data is output from the memory 9d of the CPU 9 to the indicator means 20 (Step 23). Then the long time counting means 6 is reset to "zero" (Step 24), the second drive signal from the long time counting means 6 is validated (Step 25) and the first drive signal from the short time counting means 5 is nullified (Step 26). Because no data is imprinted during the state in which no photographing is possible, data needs not be updated at intervals of one minute. The data is updated at intervals of 10 minutes to reduce power consumption.

When it is in the date mode in Step 22, the operation ends because the mode needs not be changed.

When the barrier is closed in Step 20, a barrier opening processing is performed (Step 27). Specifically, as the barrier is closed, the drive signal detecting means 8 is set up so that the CPU 9 is driven when the release switch 10 and the changeover switch 19 are manipulated to be ready for photographing.

When the main switch 15 has not been manipulated in Step 19, it is confirmed whether the CPU 9 has been driven by the manipulation of the release switch 10 (Step 28). If the release switch 10 is switched ON, a distance is measured by the distance measuring means 12 (Step 29), photometry is performed by the photometer means 11 (Step 30), focusing is performed by the auto focusing means 13 based on the distance measurement result in Step 29 (Step 31) and then exposure is performed by the exposure means 14 based on the photometric result in Step 30 (Step 32). When the exposure for printing the object to the film is completed, the date data or time data stored in the memory 9d of the CPU 9 is output to the data imprinting means 18 and the data is imprinted to the film from the data imprinting means 18 (Step 33). By the way, the data imprinting mode is set up either in the time data or in date data beforehand and is indicated in the indicator means 20. Then the film is wound up by one frame by the film winding up means 17 (Step 34), thereby completing the photographing operation.

When the release switch 10 is not switched ON in Step 29, a certain sequential processing other than photographing and changeover of the data imprinting modes of the camera is carried out (Step 35). Such sequential processing includes a film rewinding operation and others, though it will not be described here.

Though the operation carried out by the CPU 9 driven once finishes as described above, the processing is carried out after that following the aforementioned flowchart every time when the CPU 9 is driven by some factor. By the way, when the data imprinting mode is the time mode, the CPU 9 is driven by the first signal from the short time counting means 5 once in every one minute and when the mode is the date mode, the CPU 9 is driven by the second drive signal from the long time counting means 6 once in every 10 minutes.

Figure 4:
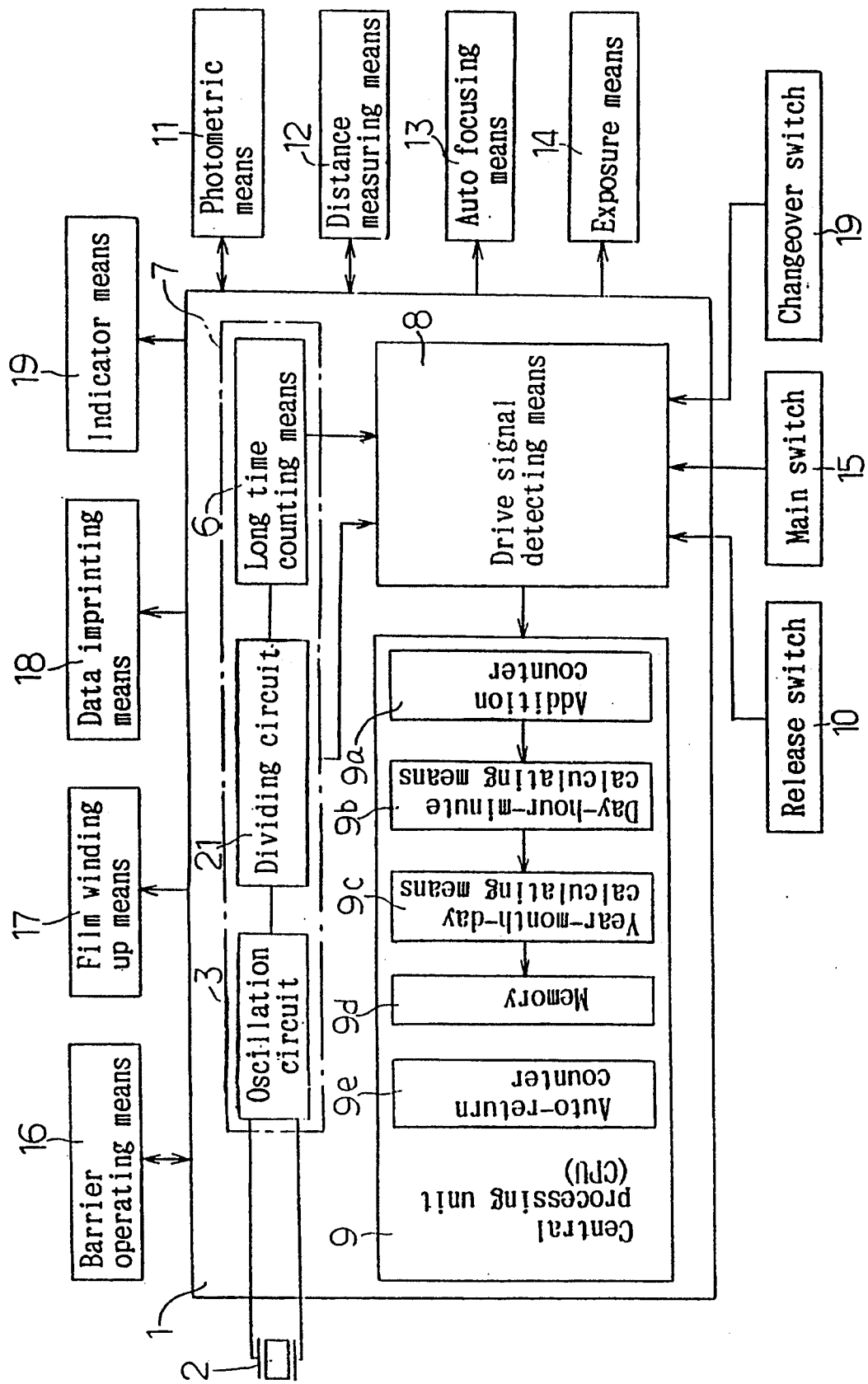
FIG. 4 is a block diagram showing a second embodiment.

FIG. 4 is a block diagram showing a second embodiment. The basic structure is the same with that of the first embodiment and the same reference numerals are given to the same parts. The second embodiment differs from the first embodiment in that a dividing circuit 21 connected with the oscillation circuit 3 which oscillates in 32 KHz sends out standard clock signals to a time counting means 22 at intervals of one minute and also the first drive signals to the drive signal detecting means 8. Then the time counting means 22 sends out the second drive signal to the drive signal detecting means 8 at intervals of 10 minutes. According to the present embodiment, two types of drive signals can be send out using only one time counting means just by changing the structure of the dividing circuit. Thereby the structure of the control circuit can be further simplified.

The gist of the present invention is to employ the drive signal outputting means that outputs drive signals to the CPU at short intervals when time data needs to be updated at short intervals such as when data in unit of minute is imprinted and that outputs drive signals to the CPU at longer intervals when time data updating interval can be relatively long such as when data in unit of day is imprinted or the camera is kept in a state incapable of photographing. Accordingly, the present invention can be modified not only as the second embodiment but also in various ways so long as one follows the gist. For example, the time interval can be arbitrary set up in such a manner that the short time counting means is set up so as to output drive signals at intervals of one second and the long time counting means is set up so as to output drive signals at longer intervals (such as one minute). It is also possible to arrange the long time counting means so as to output drive signals once in 24 hours, if the accuracy can be maintained, when year-month-day is indicated. Further, the number of types of time counting means is not limited to two. It is possible to provide more than three types of time counting means and to use properly as necessary.

Although the control circuit 1 is arranged so that the mode is changed automatically to the date mode when 30 minutes have passed since the time imprinting mode was set up last to contribute to lower the power consumption, the time for changing the modes may be also arbitrary set up. Or, it is possible to omit the auto-return counter not to change automatically from the time mode to the date mode.

Further, power consumption may be further reduced in a camera in which a release switch and a timer (counter) are interlocked and a main power source is automatically turned off when the release switch is not turned on for more than a predetermined time (around 3 minutes) in a barrier open state by arranging so that the time mode is changed automatically to the date mode when the main power source is turned off.

As described above, according to the present invention, a time counting unit need not be provided separately beside the photographing control circuit of the camera having a function for imprinting such data as time and date, so that the structure may be simplified and the size of the camera can be reduced. Further, it is possible to reduce the power consumption by appropriately changing intervals for driving the CPU corresponding to types of data to be imprinted.

It is further understood by those skilled in the art that the foregoing descriptions are preferred embodiments of the disclosed device and that various changes and modifications may be further made in the present invention without departing from the spirit and scope thereof.

What is claimed is:

1. A data imprintable camera comprising data imprinting means for imprinting data on a film and a control circuit for controlling photographing operations and for outputting data to said data imprinting means, said control circuit containing, drive signal outputting means having an oscillation circuit and at least one time counting means for timing standard clock signals supplied from said oscillation circuit via a dividing circuit and outputting a first drive signal at intervals of a first preset time and a second drive signal at intervals of a second preset time which is longer than the first preset time, and a central processing unit set up so as to select either the first or second drive signal and being driven by the selected drive signal to update date and time data.

2. The data imprintable camera according to claim 1, wherein said drive signal outputting means contains short time counting means for outputting the first drive signal based on the standard clock signal supplied from said oscillation circuit via said dividing circuit and long time counting means for outputting the second drive signal based on the standard clock signal.

3. The data imprintable camera according to claim 1, wherein said drive signal outputting means contains said dividing circuit for outputting the standard clock signal and first drive signal and said time counting means for outputting the second drive signal based on the standard clock signal.

4. The data imprintable camera according to any one of claims 1 through 3, wherein said data imprinting means is capable of imprinting date data or time data selectively on the film and said central processing unit is driven at intervals of a first preset time by the first drive signal when said imprinting means is set up so as to imprint the time data and is driven by the second drive signal when the imprinting means is set up so as to imprint the date data.

5. The data imprintable camera according to any one of claims 1 through 4, wherein said central processing unit is set up to be driven by the second drive signal when a main switch of the camera is switched off and the camera is in a state incapable of photographing.

* * * * *